(12) United States Patent
Smith et al.

(10) Patent No.: US 11,497,986 B2
(45) Date of Patent: Nov. 15, 2022

(54) MIXED REALITY SYSTEM FOR CONTEXT-AWARE VIRTUAL OBJECT RENDERING

(71) Applicant: WARNER BROS. ENTERTAINMENT INC., Burbank, CA (US)

(72) Inventors: Michael Smith, Burbank, CA (US); Lewis Ostrover, Burbank, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

(21) Appl. No.: 16/212,438

(22) Filed: Dec. 6, 2018

(65) Prior Publication Data

US 2019/0176027 A1 Jun. 13, 2019

Related U.S. Application Data

(63) Continuation of application No. PCT/US2017/035965, filed on Jun. 5, 2017.
(Continued)

(51) Int. Cl.
*A63F 13/217* (2014.01)
*G06F 3/01* (2006.01)
(Continued)

(52) U.S. Cl.
CPC .......... *A63F 13/217* (2014.09); *A63F 13/213* (2014.09); *G02B 27/01* (2013.01);
(Continued)

(58) Field of Classification Search
CPC .... A63F 13/217; A63F 13/213; A63F 13/211; A63F 13/25; G02B 27/01; G06F 3/011; G06K 9/00664; G06K 9/72; G06T 7/60
See application file for complete search history.

(56) References Cited

U.S. PATENT DOCUMENTS 8,047,915 B2 * 11/2011 Lyle ...................... A63F 13/822
463/31
9,997,199 B2 6/2018 Gewickey et al.
(Continued)

OTHER PUBLICATIONS

Rahimi, Hesam, "Context-aware prioritized game streaming," 2011 IEEE International Conference on Multimedia and Expo, 2011, pp. 1-6, (Year: 2011).*

(Continued)

*Primary Examiner* — Terrell M Robinson
(74) *Attorney, Agent, or Firm* — One LLP

(57) ABSTRACT

A computer-implemented method in conjunction with mixed reality gear (e.g., a headset) includes imaging a real scene encompassing a user wearing a mixed reality output apparatus. The method includes determining data describing a real context of the real scene, based on the imaging; for example, identifying or classifying objects, lighting, sound or persons in the scene. The method includes selecting a set of content including content enabling rendering of at least one virtual object from a content library, based on the data describing a real context, using various selection algorithms. The method includes rendering the virtual object in the mixed reality session by the mixed reality output apparatus, optionally based on the data describing a real context ("context parameters"). An apparatus is configured to perform the method using hardware, firmware, and/or software.

19 Claims, 10 Drawing Sheets

Related U.S. Application Data

(60) Provisional application No. 62/346,413, filed on Jun. 6, 2016.

(51) Int. Cl.
| | | |
|---|---|---|
| *G02B 27/01* | (2006.01) | |
| *H04S 7/00* | (2006.01) | |
| *G06V 10/70* | (2022.01) | |
| *G06V 20/10* | (2022.01) | |
| *A63F 13/213* | (2014.01) | |
| *G06T 7/60* | (2017.01) | |
| *A63F 13/211* | (2014.01) | |
| *A63F 13/25* | (2014.01) | |

(52) U.S. Cl.
CPC ............ *G06F 3/011* (2013.01); *G06T 7/60* (2013.01); *G06V 10/768* (2022.01); *G06V 20/10* (2022.01); *H04S 7/304* (2013.01); *A63F 13/211* (2014.09); *A63F 13/25* (2014.09); *A63F 2300/105* (2013.01); *A63F 2300/1087* (2013.01); *A63F 2300/8082* (2013.01); *H04S 2400/11* (2013.01); *H04S 2400/15* (2013.01)

(56) References Cited

U.S. PATENT DOCUMENTS

| | | | | |
|---|---|---|---|---|
| 2007/0265097 | A1* | 11/2007 | Havukainen | A63F 13/10 463/43 |
| 2008/0242418 | A1* | 10/2008 | Theimer | G01S 5/08 463/40 |
| 2013/0044128 | A1* | 2/2013 | Liu | G09G 5/00 345/633 |
| 2014/0176604 | A1* | 6/2014 | Venkitaraman | G06F 16/444 345/633 |
| 2014/0192084 | A1* | 7/2014 | Latta | G02B 30/00 345/633 |
| 2014/0237366 | A1* | 8/2014 | Poulos | G06F 3/013 715/728 |
| 2014/0320389 | A1* | 10/2014 | Scavezze | G06T 19/006 345/156 |
| 2015/0091941 | A1* | 4/2015 | Das | G06F 3/017 345/633 |
| 2015/0310667 | A1 | 10/2015 | Young et al. | |
| 2016/0155267 | A1* | 6/2016 | Bean | G02B 27/017 345/633 |
| 2016/0260255 | A1* | 9/2016 | Bean | G06T 19/006 |
| 2017/0220119 | A1* | 8/2017 | Potts | G06F 3/017 |
| 2018/0024630 | A1* | 1/2018 | Goossens | G06F 3/011 345/156 |
| 2019/0342632 | A1 | 11/2019 | DeFaria et al. | |

OTHER PUBLICATIONS

EP, Supplementary European Search Report 17810790.0, dated Jan. 8, 2020.

Romero, Luis et al. "HyperReal: A Hypermedia Model for Mixed Reality", Hypertext '03. The 14th. AMC Conference on Hypertext and Hypermedia. Nottingham, UK, Aug. 26-30, 2003; [ACM Conference on Hypertext and Hypermedia], New York, NY: ACM, US, Aug. 26, 2003, pp. 2-9.

Buzeto Fabricio Nogueira et al. "Reconfigurable Games: Games that Change with the Environment", 2014 Brazilian Symposium on Computer Games and Digital Entertainment, IEEE, Nov. 12, 2014, pp. 61-70.

Barclay Adam et al. "An Event-Driven, Stochastic, Undirected Narrative (EDSUN) Framework for Interactive Contents", Dec. 4, 2006, Technologies for Interactive Digital Storytelling and Entertainment Lecture Notes in Computer Science; LNCS, Springer, Berlin, DE, pp. 13-24.

WO, PCT/US2017/035965 ISR and Written Opinion, dated Oct. 5, 2017.

* cited by examiner

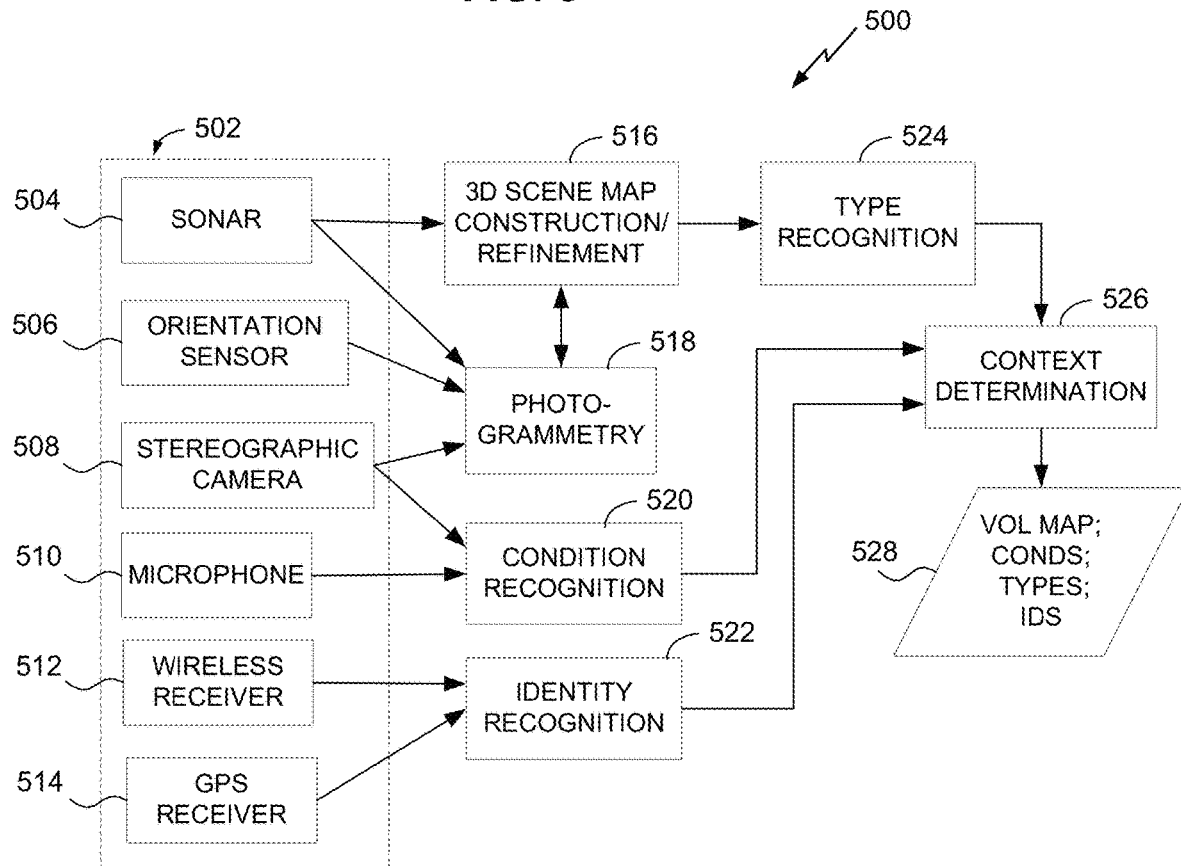
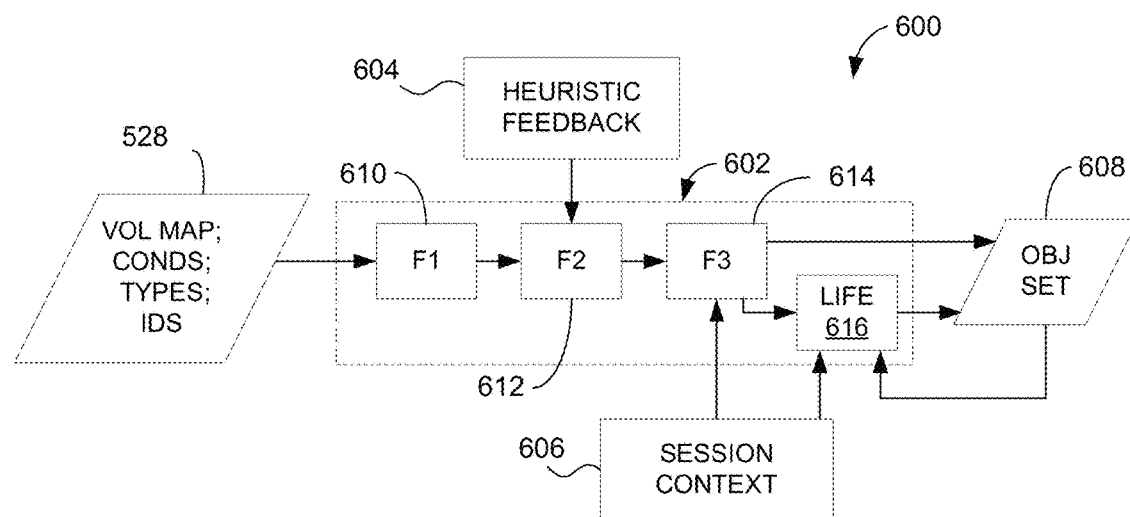

910 IMAGING A REAL SCENE ENCOMPASSING A USER WEARING A MIXED REALITY OUTPUT APPARATUS

920 DETERMINING CONTEXT PARAMETER DATA DESCRIBING A REAL CONTEXT OF THE REAL SCENE, BASED ON THE IMAGING

930 SELECTING A SET OF CONTENT FROM A CONTENT LIBRARY, BASED ON THE DATA DESCRIBING A REAL CONTEXT

940 RENDERING THE VIRTUAL OBJECT IN THE MIXED REALITY SESSION BY THE MIXED REALITY OUTPUT APPARATUS, OPTIONALLY BASED ON THE CONTEXT PARAMETERS

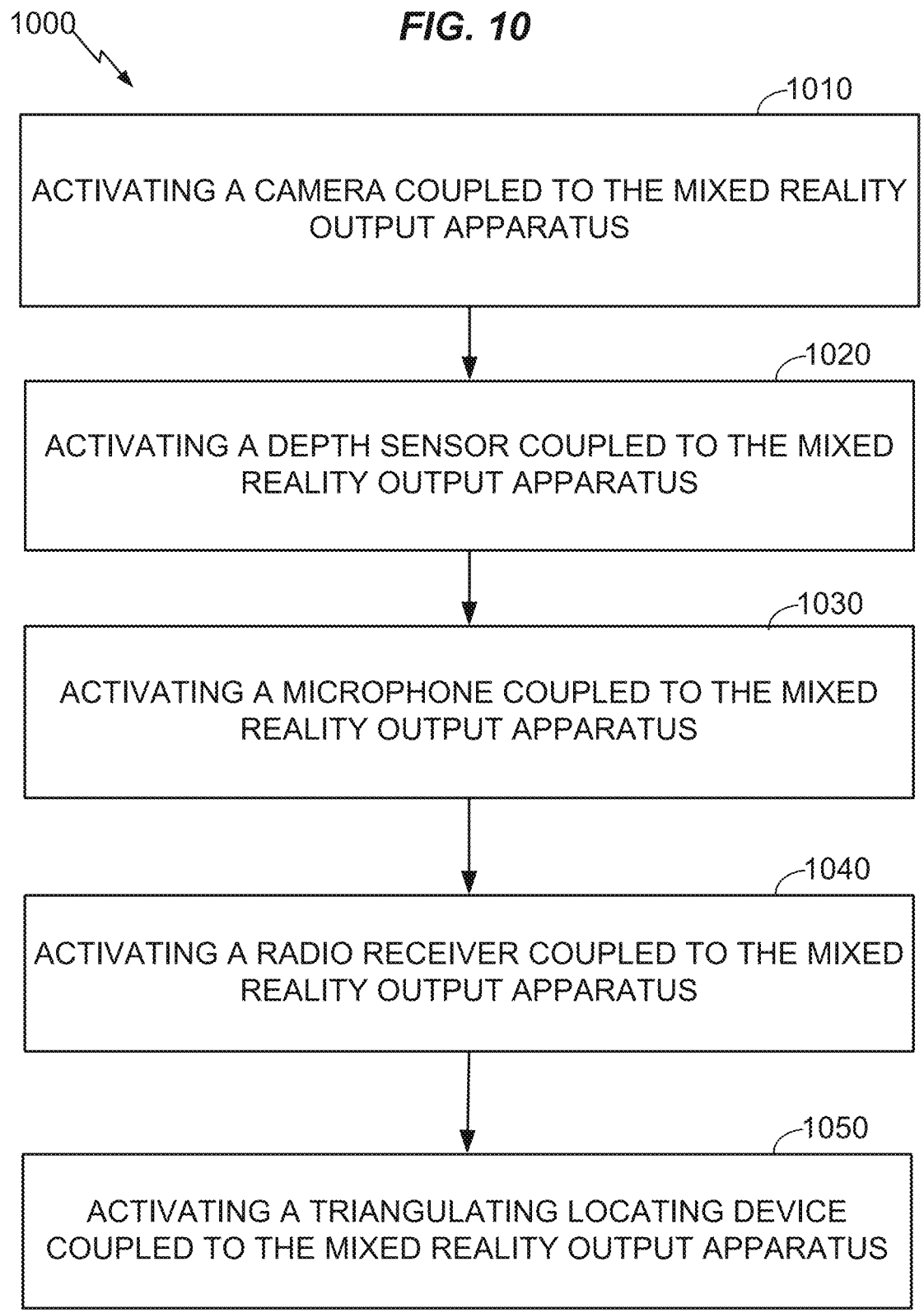

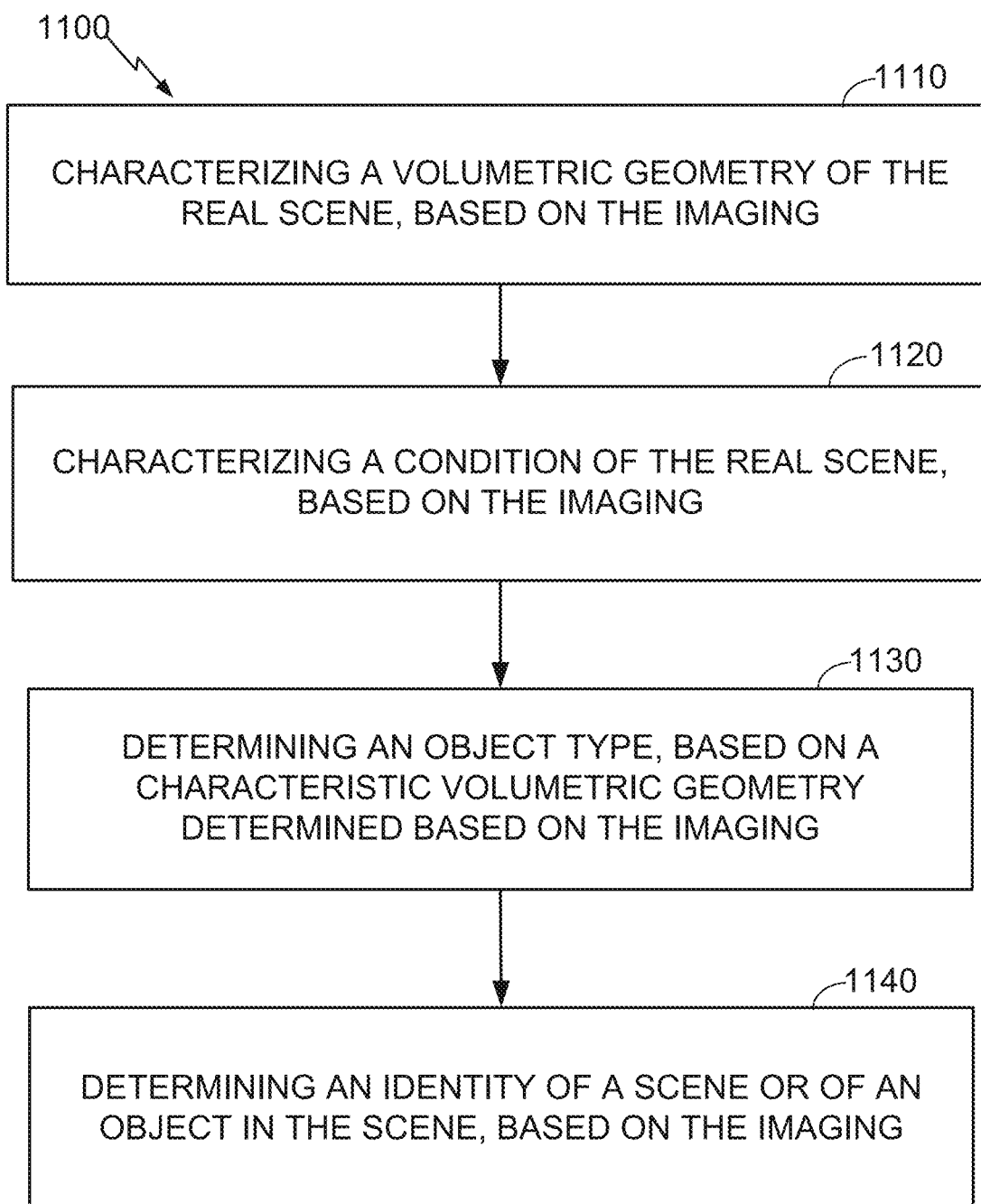

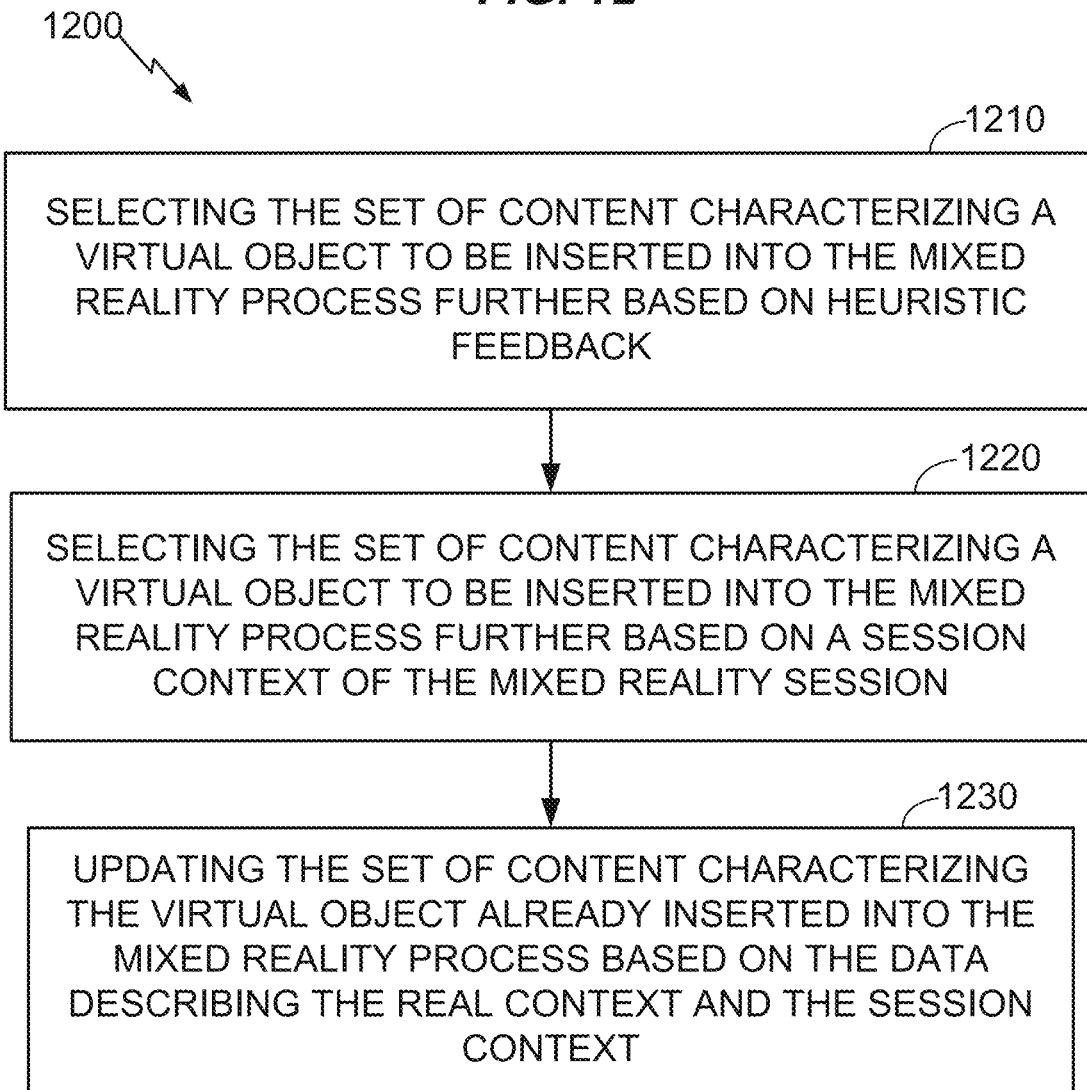

MIXED REALITY SYSTEM FOR CONTEXT-AWARE VIRTUAL OBJECT RENDERING

CROSS-REFERENCE TO RELATED APPLICATION

The present application is a continuation of International Application PCT/US2017/035965 filed Jun. 5, 2017, which claims priority to U.S. provisional patent application Ser. No. 62/346,413 filed Jun. 6, 2016, which applications are incorporated herein by reference in their entireties.

FIELD

The present disclosure relates to methods and apparatus for configuration, by a computer, of digital data for virtual reality or augmented reality output that is geometrically and chronologically coordinated with user context-relevant parameters determined from sensor data responsive to the user's physical environment.

BACKGROUND

"Virtual reality" is a term that has been used for various types of content that simulates immersion in a three-dimensional (3D) world, including, for example, various video game content, and animated film content. In some types of virtual reality, a user can navigate through a simulation of a 3D environment generated based on the computer model, by controlling the position and orientation of a virtual camera that defines a viewpoint for a 2D scene that is displayed on a two-dimensional display screen. A variation of these technologies is sometimes called "augmented reality." In an augmented reality setup, the display technology shows a combination of the user's surroundings that is "augmented" by one or more digital objects or overlays. Augmented reality content may be as simple as textual "heads up" information about objects or people visible around the user, or as complex as transforming the entire appearance of the user's surroundings into a fantasy environment that corresponds to the user's real surroundings. Virtual reality (VR) and augmented reality (AR) when applied to mix real objects from the user's surroundings with virtual objects are collectively referred to herein as "mixed reality."

Virtual reality (VR) and augmented reality (AR) have been applied to various types of immersive video stereoscopic presentation techniques including, for example, stereoscopic virtual reality headsets. Headsets and other presentation methods immerse the user in a 3D scene. Lenses in the headset enable the user to focus on a lightweight split display screen mounted in the headset only inches from the user's eyes. Different sides of the split display show right and left stereoscopic views of video content, while the user's peripheral view is blocked. In another type of headset, two separate displays are used to show different images to the user's left eye and right eye respectively. In another type of headset, the field of view of the display encompasses the full field of view of eye including the peripheral view. In another type of headset, an image is projected on the user's retina using controllable small lasers, mirrors or lenses. Either way, the headset enables the user to experience the displayed virtual reality content more as if the viewer were immersed in a real scene. In the case of augmented reality (AR) content, the viewer may experience the augmented content as if it were a part of, or placed in, an augmented real scene. A similar effect can be achieved using virtual reality headsets by including real-time image data from a stereoscopic camera pair mounted to the user's headset in the VR feed, and rendering virtual objects mixed with the real-time image feed.

These immersive effects may be provided or enhanced by motion sensors in the headset that detect motion of the user's head, and adjust the video display(s) accordingly. By turning his head to the side, the user can see the virtual reality scene off to the side; by turning his head up or down, the user can look up or down in the virtual reality scene. The headset may also include tracking sensors that detect position of the user's head and/or body, and adjust the video display(s) accordingly. By leaning or turning, the user can see the virtual reality scene from a different point of view. This responsiveness to head movement, head position and body position greatly enhances the immersive effect achievable by the headset. The user may be provided the impression of being placed inside or "immersed" in the virtual reality scene. As used herein, "immersive" generally encompasses both VR and AR.

Immersive headsets and other wearable immersive output devices are especially useful for game play of various types, which involve user exploration of a modelled environment generated by a rendering engine as the user controls one or more virtual camera(s) using head movement, the position or orientation of the user's body, head, eye, hands, fingers, feet, or other body parts, and/or other inputs. To provide an immersive experience, the user needs to perceive a freedom of movement that is in some way analogous to human visual perception when interacting with reality. Content produced for VR can provide this experience using techniques for real-time rendering that have been developed for various types of video games. The content is may be designed as a three-dimensional computer model with defined boundaries and rules for rendering as video output. This content can be enhanced by stereoscopic techniques to provide stereoscopic output, sometime referred to as "3D," and associated with a VR application that manages the rendering process in response to movement of the VR headset, to produce a resulting VR experience. The user experience is very much like being placed inside a rendered video game.

However, use of VR and AR for immersive entertainment is limited to specific contexts, for example while the user is stationary (e.g., seated in a chair) or confined to moving in a small space defined by a sensor array. In such limited contexts, there is little opportunity for a mixed reality application to incorporate information in the user experience as the user's context changes, because there is little change that occurs in that context during the period of play.

It would be desirable, therefore, to develop new methods and other new technologies for configuring digital content for VR and AR use, that overcome these and other limitations of the prior art and enhance the appeal and enjoyment of mixed reality content for new immersive technologies such as VR and AR.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method includes imaging a real scene encompassing a user wearing a mixed reality output apparatus. The method may include determining data describing a real context of the real scene, based on the imaging. The method may include selecting a set of content from a content library, based on the data describing a real context. The set of content may be, or may include, data that enables rendering of a virtual object. The method may include rendering a virtual object described by the set of content in the mixed reality session by the mixed reality output apparatus, based on the data describing a real context. For example, lighting parameters may be automatically taken or derived from the context parameters by the computer processor.

The foregoing method may be implemented in any suitable programmable computing apparatus, by provided program instructions in a non-transitory computer-readable medium that, when executed by a computer processor, cause the apparatus to perform the described operations. An apparatus may include a computer or set of connected computers that is used in mixed reality production or is installed in a user head set. Other elements of the apparatus may include, for example, an audio output device, and a user input device, which participate in the execution of the method. An apparatus may include a virtual reality device, such as a headset or other display that reacts to movements of a user's head or body to provide the impression of being placed inside of the rendered scene in which a game is played or narrative content is being displayed.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 5 is a block diagram illustrating aspects of a system performing real context description determination using input from a sensor array.

FIG. 6 is a block diagram illustrating aspects of system performing content selection for a mixed reality process based on a data describing a real context.

FIG. 9 is a flow chart illustrating a method for mixed reality content selection.

FIGS. 10-12 are flow charts illustrating further optional aspects or operations of the method diagrammed in FIG. 9.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
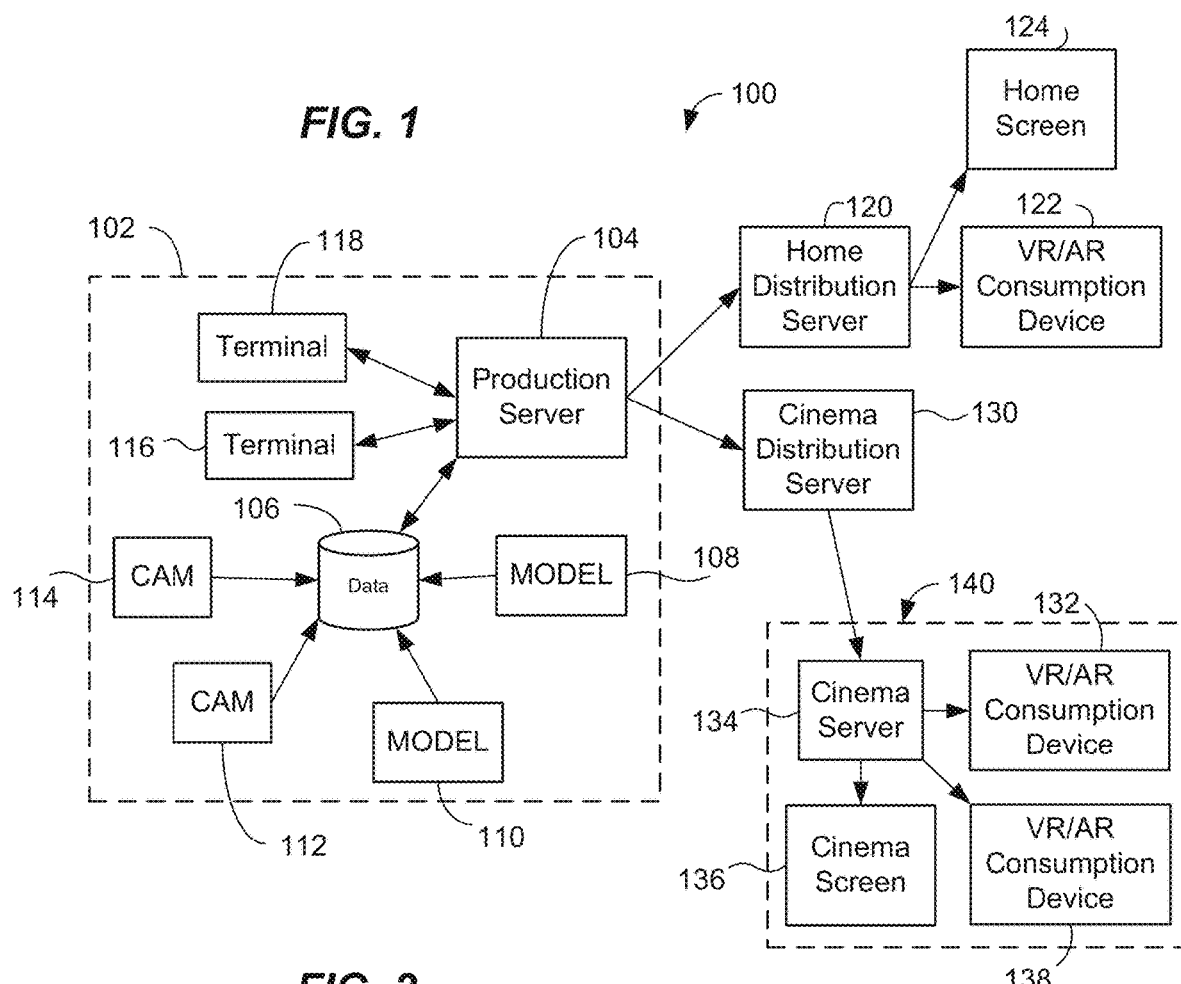
FIG. 1 is a schematic block diagram illustrating aspects of a system and apparatus for the production and configuration of digital data for mixed reality output coupled to a distribution system.

An illustrative system 100 for production and distribution of mixed reality content is shown in FIG. 1. The system 100 may include a set 102 of production activities that produce assets that are shared and used in different ways across related different versions (e.g., immersive and non-immersive versions) of underlying creative content. Creative content includes, for example, video data collected by various camera systems 112, 112, audio data collected and/or generated by audio subsystems (not shown), and computer modeling/animation data created and arranged from various modeling/animation subsystems 108, 110. Creative content may be stored in a data store 106. It should be appreciated that the system may include several different data stores (not shown). A production server component 104, which may comprise a family of production applications operating over a computer network, may access data in the data store 106 under control of various production staff controlling the production process via multiple access terminals 118, 116. The number of components shown in system 100 is merely illustrative. It should be appreciated that a typical feature film or other studio production system will typically include a much larger number of components than illustrated. Creative and technical directors oversee the assembly of creative content from the various data sources, configured for immersive output devices and more traditional non-immersive devices.

Digital content produced by the system may include various versions of the same or related creative titles, for example, immersive mixed reality AR and VR versions in the nature of a video game or interactive narrative; various non-immersive versions such as, for example, a 2D theater version, a 2D home theater version, a mobile device version, a stereoscopic 3D version for one or more of theater, home or mobile devices; combination immersive and non-immersive versions such as, for example, a VR version for an in-theater experience, in conjunction with supporting 2D or stereoscopic 3D content, a VR version for home use, likewise for use with non-immersive content; an AR version for supplementing non-immersive content in a theater, an AR version for supplementing non-immersive content in a home theater environment or in a mobile device format. Finished productions in each of the various versions may be provided to a home distribution server 120 which may store the different versions in a content data store (not shown) in association with metadata for managing use and distribution. A least one set of consumers may receive multiple versions of immersive and non-immersive content in a single digital content (media) package, whether stored under control of a network served 120, or locally on a computer-readable medium such as an optical disc or memory device.

Different distribution channels each assigned its own server resources may be used to provide content to different sets of end users. For example, a cinema distribution server 130 may distribute immersive and conventional content to cinemas for public performance. For illustrative clarity, one cinema 140 of potentially many cinemas is diagrammed. Each cinema 140 may include at least one server 134 used to distribute digital content to one or more theaters each hosting a performance. Each theater (or the theater, if only a single theater is served by the server 143) includes a cinema screen 136 and one or more viewers each wearing an immersive content consumption device, 132, 138, for example, a VR visor or AR headset. The same underlying audio-video program may thereby be distributed in different versions for home and cinema use. Both home and cinema versions may include technical elements that coordinate different immersive devices contemporaneously playing the audio-video program in an immersive format. In addition, both versions may include elements that coordinate play of immersive content with contemporaneous or non-contemporaneous content playing on a 2D screen.

Interactive mixed reality content may be designed for rapidly changing contexts, for example, a user strolling through a park or urban environment, and is not generally designed to be coordinated with non-immersive content. However, interactive mixed reality content may sometimes be coordinated with non-immersive content for clips of limited duration appearing in the user's environment. For example, a mixed reality AR application may detect that the user is viewing a video billboard or other image display appearing in the user's real environment, and configure the mixed reality content based on the content appearing on the real display in some way. For example, the mixed reality application may be configured to replace the content appearing on a real video display or static image display with a substitute video or static image in the mixed reality session. In an alternative, or in addition, the mixed reality application may be configured to cause a virtual object or character that relates to content appearing on the real display to appear in the mixed reality session. For example, if the real content includes advertising for a particular product, the application may insert an animated mascot character for the product (or for a competing product) in the mixed reality session. For further example, if the real content depicts a particular scene, object, theme or character, the application may insert virtual content that enhances, parodies, or contradicts the real content.

In some embodiments, a media package holding coordinated immersive and non-immersive content may be, or may include, a single computer-readable medium (for example, an optical disc medium or FLASH memory device) in which packaged digital content is stored together. Distribution of a non-transitory, tangible and portable storage medium may reduce network bandwidth demands and ensure reliable and seamless access to dense digital content by the consumption device. In some embodiments, rapid distribution to tangible media may be accomplished by distribution from selected kiosks holding electronic copies of digital content for writing to digital copies. In an alternative, such kiosks may take advantage of high-bandwidth connections to obtain the electronic content for distribution. In other embodiments, including for example for cinema distribution, the electronic content may be transmitted over a communications network and/or computer network and stored directly on a memory device or medium connected to or integrated with a client device that will participate in playback of the received content. Mixed reality interactive versions may be distributed in conjunction with distribution of other versions. For example, a user attending a cinematic presentation of a feature film may be provided with an option to download a related mixed reality interactive game from a cinema distribution server to a head set data storage unit while watching the feature film, or to receive the mixed reality game on a portable memory device, or to receive a stream that accompanies the cinematic presentation, adding mixed reality assets to enhance the otherwise cinematic-only presentation.

Figure 2:
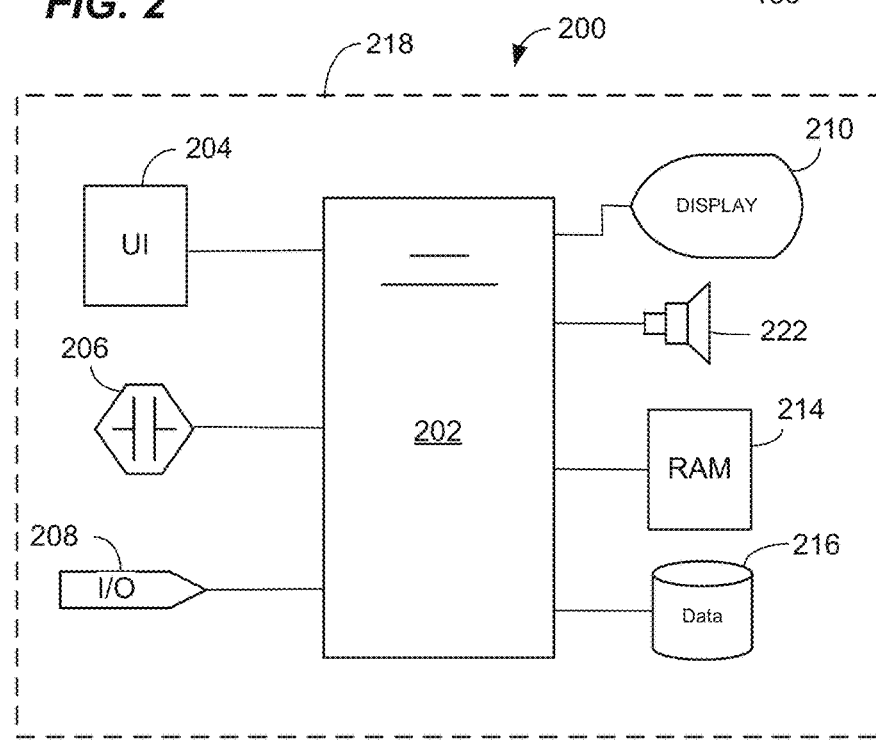
FIG. 2 is a schematic block diagram illustrating more detailed aspects of an apparatus for outputting mixed reality content.

Referring to FIG. 2, aspects of a content consumption device 200 for consuming mixed reality immersive content are illustrated. Several viewers of a home theater or cinema presentation may be equipped with the content consumption device. The apparatus 200 may include, for example, a processor 202, for example a central processing unit based on 80×86 architecture as designed by Intel™ or AMD™, a system-on-a-chip as designed by ARM™, or any other suitable microprocessor. The processor 202 may be communicatively coupled to auxiliary devices or modules of the 3D environment apparatus 200, using a bus or other coupling. Optionally, the processor 202 and some or all of its coupled auxiliary devices or modules (examples of which are depicted at 204-216) may be housed within or coupled to a housing 218, for example, a housing having a form factor of a wearable googles, glasses, or visor, or other form factor.

A user interface device 204 may be coupled to the processor 202 for providing user control input to an immersive mixed reality content display process operated by a mixed reality immersive display engine executing on the processor 202. User control input may include, for example, selections from a graphical user interface or other input (e.g., textual or directional commands) generated via a touch screen, keyboard, pointing device (e.g., game controller), microphone, motion sensor, camera, or some combination of these or other input devices. Control input may also be provided via a sensor 206 coupled to the processor 202. A sensor may comprise, for example, a motion sensor (e.g., an accelerometer), a position sensor, a camera or camera array (e.g., stereoscopic array), a biometric temperature or pulse sensor, a wind speed and direction sensor, a touch (pressure) sensor, an altimeter, a location sensor (for example, a Global Positioning System (GPS) receiver and controller), a distance sensor (e.g., electronic tape measure), a proximity sensor, a motion sensor, a smoke or vapor detector, a gyroscopic position sensor, a radio receiver, a multi-camera tracking sensor/controller such as, for example, available from Microsoft™ under the brand Kinect™, an eye-tracking sensor, a microphone or a microphone array. The sensor 206 may detect a user context, meaning an identify, position, size, orientation and movement of the user's physical environment and of objects in the environment, motion or other state of a user interface display, for example, motion of a virtual-reality headset, or the bodily state of the user, for example, facial expression, skin temperature, pupil dilation, respiration rate, muscle tension, nervous system activity, or pulse.

The device 200 may optionally include an input/output port 208 coupled to the processor 202, to enable communication between a mixed reality engine and a computer network, for example a cinema content server or home theater server. Such communication may be used, for example, to enable multiplayer VR or AR experiences, including but not limited to shared immersive experiencing of cinematic content. The system may also be used for non-cinematic multi-user applications, for example social networking, group entertainment experiences, instructional environments, video gaming, and so forth.

A display 220 may be coupled to the processor 202, for example via a graphics processing unit (not shown) integrated in the processor 202 or in a separate chip. The display 210 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display device 210 may be incorporated into a virtual reality headset or other immersive display system. Video output driven by a mixed reality immersive display engine operating on the processor 202, or other application for coordinating user inputs with an immersive content display and/or generating the display, may be provided to the display device 210 and output as a video display to the user (also referred to herein as the "player"). Similarly, an amplifier/speaker or other audio output transducer 222 may be coupled to the processor 202 via an audio processing system. Audio output correlated to the video output and generated by the mixed reality display engine or other application may be provided to the audio transducer 222 and output as audible sound to the user.

The 3D environment apparatus 200 may further include a random access memory (RAM) 214 holding program instructions and data for rapid execution or processing by the processor during controlling a modeled 3D objects or environment. When the device 200 is powered off or in an inactive state, program instructions and data may be stored in a long-term memory, for example, a non-volatile magnetic, optical, or electronic memory storage device 216. Either or both of the RAM 214 or the storage device 216 may comprise a non-transitory computer-readable medium holding program instructions, that when executed by the processor 202, cause the device 200 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

Figure 3:
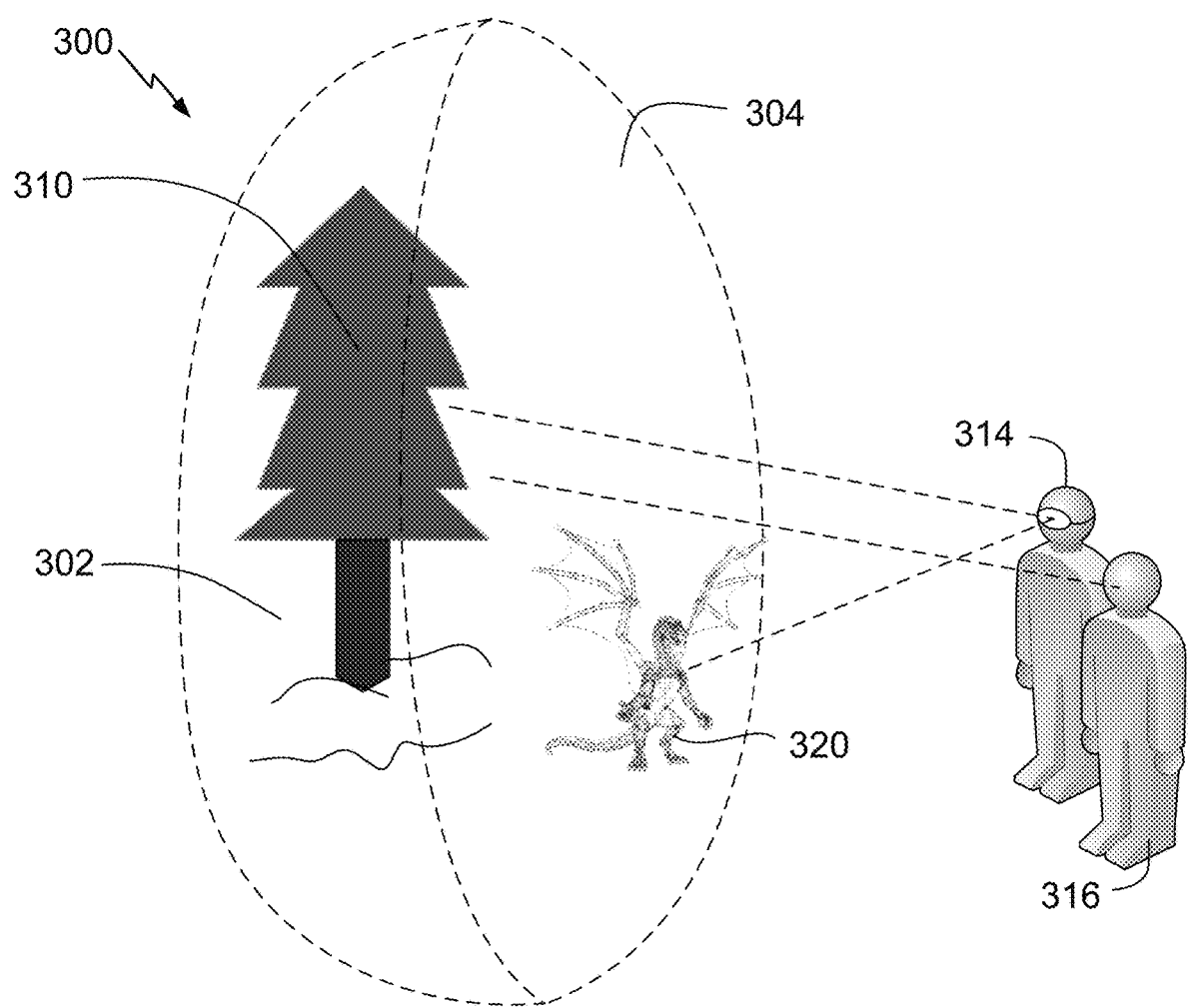
FIG. 3 is a schematic diagram illustrating aspects of viewing mixed reality content from the perspective of different viewers.

FIG. 3 illustrates aspects of mixed reality content using AR or VR in a viewing space 300 shared by multiple persons 314, 316. A first person 314 wearing an AR or VR headset views a real content object 310 ("tree") in the viewing space. If using VR equipment, the real object 310 may be captured by a camera of camera array mounted to the headset and displayed on a VR display screen. If using an AR visor or glasses, the person 314 sees the object 310 through a transparent portion of the VR equipment. In addition, the first person sees a virtual dragon 320 standing in front of the tree 310. A second person 316 is viewing the object 310 with "naked eyes" and no equipment. The second person 316 sees nothing except the actual physical surroundings (e.g., object 310) in the area surrounding the screen 302.

Figure 4:
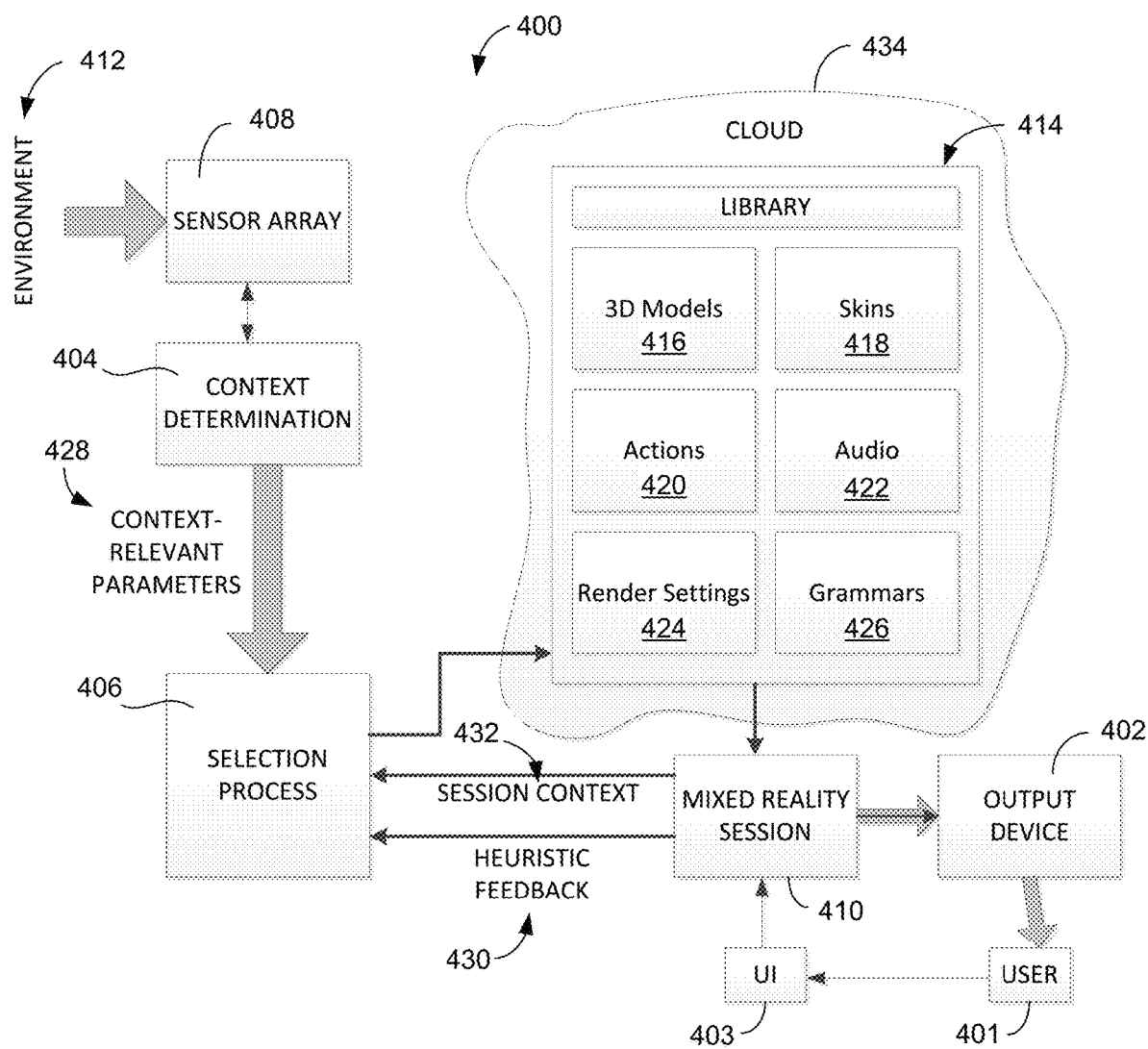
FIG. 4 is a concept diagram illustrating elements of a system for context determination and content selection for a mixed-reality session.

FIG. 4 shows a system 400 of cooperating components for providing a context-responsive mixed reality output for at least one user 401 who interacts with a mixed reality session 410 operated by at least one computer processor via a user interface 403. The system 400 may include algorithms and processes 404, 406 executed by, or in connection with, a mixed-reality output device 402 operated by a user. The processes 404, 406 process and apply sensor data from a sensor array 408 that collects data from the user's physical environment. The process 404 extracts context information relevant to a mixed reality session 410 executing on or in connection with the output device 402, or that will be initiated on the device 402. The selection process 406 receives context relevant parameters from the context determination process 404, and uses the parameters to select mixed-reality objects from a library residing in a computer memory, for example, in a networked cloud data structure 434. The processes 404, 406 and 410 may execute in a processor or processor of a local mixed reality client worn by the user 401, or by some combination of local client processors and processors that are locally or remotely networked to the local client via any suitable computer network or combination of computer networks.

For purposes of the present disclosure, the executable system of algorithms and processes 404, 406 are collectively called a "Mixed Reality Context Engine" or "MRCE." The MRCE uses the sensor data from the array 408 to obtain context parameters (also called context-relevant parameters) that can be used in the mixed-reality session 410 to select and conform objects and events occurring in the mixed reality session with objects and events in the user's physical environment 412. The context parameters 428 may be selected and determined by the MRCE 404, 406 based on the sensor data obtained from the sensor array 408 that is sensing the current physical environment 412, and on current session context information 432 from the mixed reality session 412. Session context information 432 may be determined directly from a known memory state of the mixed reality session 410, based on data provided to the output device 402. In the alternative, or in addition, if the selection process 406 does not have direct access to the session state 410, object recognition software and/or image analysis software can also provide context information based on output (e.g., audio and video output) from a mixed reality session 410. In whatever manner the session context information 432 is obtained, it may be used in conjunction with sensor output to select content for the mixed reality session 410, as further described below.

The context parameters 428 may be used, for example, to select a new mixed-reality object or effect from a library 414 of mixed-reality objects or effects. The mixed reality object or effect may be pre-recorded as a rendered object, for static objects. More generally, the mixed reality object or effect may be preconfigured as a renderable object, and rendered using inputs that are selected based on the current context. Rendering inputs may include, for example, a character animation sequence or set of rules for animating the object in mixed reality, lighting and viewpoint definitions, rendering engine configuration, and many other settings as known in the digital rendering arts. In addition, or in an alternative, model attributes besides animation, object scale and motion may be algorithmically created on the fly. For example, the object's appearance and skin may be generated or altered based on an algorithm that takes as inputs context information and character components, and outputs a character or other object that is customized for the current context in both appearance and behavior. A session module may compile the custom object and insert it into the mixed reality session 410, or use the object to initiate a new mixed-reality session. For example, if the sensors indicate that the user is in a location for which historical mixed-reality data exists, the session may select one or more objects or characters that are relevant to the location generically or specifically. Inserting a mixed-reality animation of an un-identifiable baseball player when the sensors indicate that the user is located in or near a baseball diamond is an example of generic relevance. Inserting an animated historical or public figure when the user 401 is located in a place of significance to the figure is an example of specific relevance.

The selection process 406 may use different selection algorithms for selecting content from the library 414 based on what is happening in the mixed reality session 410 as determined from session context information 432. For example, if the user's avatar is located in virtual dragon-infested territory, the process may use dragon selection algorithms designed to select dragon models from the models category 416, dragon appearance characteristics from the skins category 418, and other dragon-related session objects from other categories. In addition, or in the alternative, the selection process 406 may use different selection algorithms for selecting content from the library 414 based on physical environment parameters from the physical context determination process 404. For example, if the process 404 indicates that the user is walking through wooded parkland, the selection process 406 may select content from the library based on a "woodland" set of algorithms, which select library content appropriate for wooded areas. In alternative embodiments, a selection algorithm may select content based on a multi-factor priority ranking that includes both physical context and virtual context factors, so that both play a role in content selection that may vary based on contextually-determined weighting factors.

For further example, the context parameters 428 may be used to position, orient, and/or scale a selected mixed-reality object or effect in a mixed reality session, based on objects or events sensed in the user's physical environment. For example, the parameters may be used to cause a mixed-reality object to appear to react to physical objects in the physical environment, such as, for example, to bounce off of or to stick to physical objects.

For further example, the context parameters 428 may be used to make geometric adjustments to the shape of a selected mixed-reality object or effect in a mixed reality session, based on objects or events sensed in the user's physical environment, so that the mixed reality object or effects conform to a desired mixed reality grammar desired for the session.

In an aspect of the system 400 and related methods, the selection from the library may use an artificial intelligence process to select an object or effect that is relevant to the user's physical environment but that is not easily predictable or deterministic, for the same user or between different users. For example, different users who are nearby to each other and operating the same mixed-reality program may see different mixed reality objects or effects. For further example, based on heuristic feedback 430, the selection process 406 may cause a user returning to the same place to never see precisely the same object or effect twice, unless requested. In addition, or in an alternative, the contextual relation(s) between the environment used to make a selection may be varied by a non-deterministic (e.g., random) algorithm or function, so that there is always an element of surprise concerning how an object is selected, and consequently, which object or which type of object will be selected. At the same time, the selection algorithm should choose an object with some user-discernable relevance to the physical place or circumstance. A non-deterministic algorithm may include, for example, random and heuristic elements.

Categories of library content may include, for example, 3D modeling data 416, which provides surface-modeling, animation armature, and physics parameters for virtual objects to be rendered. Another category may be "skins" 418 that define the surface characteristics of the model to be rendered, for example, diffuse and specular colors, roughness, and other surface characteristics. An "action" category 420 may include animation loops for objects and characters. An "audio" category 422 may include audio clips or samples, code for generating audio procedurally, files for controlling audio parameters such as, for example, volume and stereo separation, and other audio-related data. A "render settings" category 424 may include rendering control parameters, links to executable code, and data for controlling rendering of objects as appropriate for a particular context. A "grammar" category 426 may include high-level codes describing various different types of relationships between rendered virtual objects and reference objects in a real scene, of which examples are provided elsewhere herein. The selection process 406 may pick one or more objects from each category (or from fewer or additional categories) to determine exactly how one or more virtual objects are to be inserted into a particular mixed reality session.

Referring to FIG. 5, a real context determination module or process 500 may process sensor data from a sensor array 502 to arrive at a particular context description 528 for any given real environment. While various different sensors may also be suitable, the depicted seven-sensor array 502 should suffice for supporting determination of a context description based on object and scene types, scene and object geometry, scene conditions, and scene and object identities.

A sonar sensor 504 can be used to determine current distances to objects in the scene and the relative solidity of the objects. Time lag from signal to receipt of echo and the echo profile can be used to construct a scene depth map from the point of view of any acoustic emitter/receiver pair. An array of such pair may be used to construct a detailed scene and object model using a photogrammetric process 518. Input from an orientation sensor 506 mounted to the user's head may be used to set current viewpoint parameters. Orientation sensors may include, for example, a solid-state accelerometer array, mechanical tilt sensor array, or gyroscopic unit. Sonar data can be coupled with visible and/or infrared images from an array of two or cameras 508 in the photogrammetric process 518 to construct and maintain a model or scene map as a user moves through a physical environment.

A scene map may be expressed in any suitable modeling data format, for example, Virtual Reality Modeling Language (VRML) format, or in a proprietary simplified format. For context determination, it is mainly desired to know the shape of a scene and objects within it, and the relative solidity of objects in the scene, so it can be determined where virtual objects can be positioned and moved without violating a chosen grammar. Detailed model information for rendering may be useful, but is not required in many context determination applications. Accordingly, for example, a suitable simplified format may express shape information for any given object using a set of volumetric geometric shapes each associated with a solidity factor, a rigidity factor or profile, a scale factor and an orientation, with some geometric interrelationship between each shape in the set. These geometric parameter sets can be rough approximations; for example, a set specifying "5 foot diameter sphere, 30% solidity centered atop a cylinder, 4 feet long 0.5 feet diameter 100% solidity" may suffice to identify the object as a small tree.

A type recognition process 524 may be used to characterize any particular set of shapes as being of a specified type, for example, "tree," "floor," "wall," "ceiling," "cloud," "table," and so forth. Scene types may include various types of outdoor scenes and indoor scenes, most of which can be characterized using a small parameter set. A library of a few hundred basic object types should suffice to characterize most common types, keeping in mind that for entertainment purposes highly accurate typing is seldom required, while accurate geometric and solidity information may be more important than type for providing a consistent and credible mixed reality experience. For example, it may be more important that a rendered virtual object consistently appear to be unable to pass through a solid object in the scene, than for the object to recognize the type of solid object it is navigating around. Type determination may be purely algorithmic, based on a real-time comparison between a detected object's geometric parameter set and geometric parameter envelopes defined by a type library. Fuzzy logic may be used to choose the object types based on input as described.

Data from the camera array 508 and an array or one or more microphones may be used to recognize 520 conditions of the scene, primarily lighting conditions and acoustic conditions. Other conditions of interest may include, for example, atmospheric conditions (e.g., rain, smoke, snow or fog). For weather-related conditions, GPS data from a GPS receiver 514 may be compared with published weather reports.

Recognition 522 of particular identities of scenes and objects within them can be based on location (e.g., GPS) coordinates from a GPS receiver 514 (or other triangulating location sensor) and published location information, or upon object recognition and/or image analysis software. For smaller objects, radio frequency tagging may be used, with tags detected by a wireless receiver 512. For example, a mixed reality amusement park might place RFID tags on numerous real items placed throughout the park, so that each user's AR or VR equipment can quickly locate and identify nearby objects based on a unique identifier transmitted by each tag placed on each respective one of the objects.

Input from type recognition 524, condition recognition 520 and identity recognition 522 may be integrated and processed by a final real context determination module 526 that produces as output computer-readable data describing a real current context, sometime referred to herein as a context description, or a real context description. The real context description may be placed in a memory location having an address or pointer that is possessed by other modules of the mixed reality process, especially a content selection module. As the context changes through time, the context determination module 526 updates the current context description. A context description may include, for example, a volumetric solidity map or model of the physical environment; environmental condition parameters; scene and object types; and scene and object identities. The priority of the description may be in the order listed, with the volumetric solidity map having the highest priority. Condition information is also high priority; condition and solidity are both needed to implement insertion of mixed reality objects in a real environment according to a consistent grammar. Type and identity information is useful for providing a more varied and enriching experience, but not as fundamental to providing a basic user experience.

A real context description may be blended with a mixed reality context description and optionally with heuristic feedback from a particular combination of user and mixed reality session to perform a virtual content selection process. By way of example, FIG. 6 shows elements of one such selection process 600 based on the real context description 528 and other inputs. A content selection 603 may include different internal modules or components. For example, a first filter process 610 parses the real context description 528 and uses a set of logical rules (which may include fuzzy logic) to eliminate library content from consideration that is incompatible with the physical parameters of the scene. This may be conceptually understood as a first filter pass of library content. "Incompatible" may mean that a set of content cannot possibly comply with a specified grammar for the mixed reality session, or may have any other desired meaning so long as it results in a filtering of available content sets. It should be appreciated that ranking of content sets is equivalent to filtering.

A second filter process 612 may re-rank or further filter the output of the first process 610, according to heuristic feedback. Heuristic feedback may include any user input that bears some logical relationship to the history (past events) of the current mixed reality session, or of past mixed reality sessions. For example, heuristic feedback may be used to prevent objects from being repeatedly selected at different times to provide a more varied user experience, or to select objects in conformance with user preference data. In an alternative, or in addition, the selection process 406 may randomly select a virtual object to include in the mixed reality session. For example, the selection process may select a class of objects (e.g., "dragons") based on real context, session context, or heuristic feedback, and randomly select a particular instance of the class (e.g., a particular dragon object).

A third filter process 614 may re-rank or further filter the output of the second process 612, based on a current session context. For example, if the user has just finished dispatching a difficult computer-generated adversary, the process 614 may prioritize celebratory characters or objects over adversarial ones. The third process 614 selects an object set based on a final ranking, which is inserted into the mixed reality process. The behavior of the inserted object and its eventual exit from the mixed reality process may be predetermined, or may be managed in a context-responsive manner by a "life" module 616, using session context and any changes in the real context description 528 to determine behavior and other temporal changes in object characteristics, including when and how the mixed reality object is to be removed from the current session.

Figure 7:
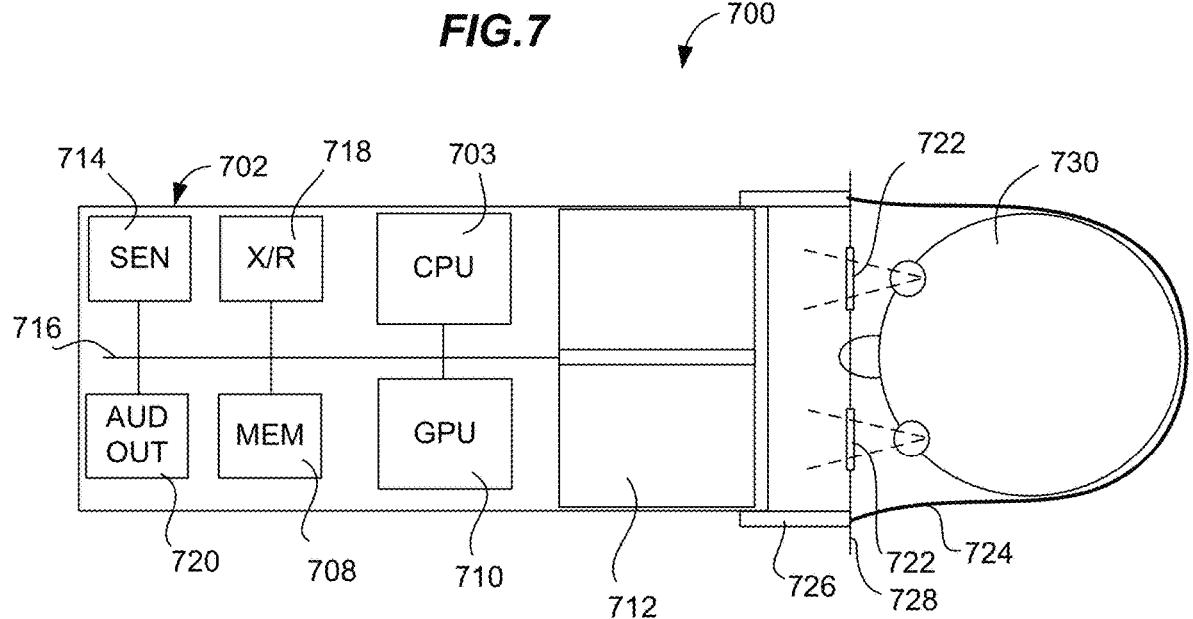
FIG. 7 is a schematic diagram illustrating components of a stereoscopic display device for providing an immersive mixed reality experience.

Any of the features described herein may be executed by an application for providing a 3D environment responsive to user input that produces VR output for an immersive VR headset or the like. FIG. 7 is a schematic diagram illustrating one type of an immersive VR stereoscopic display device 700 may be provided in various form factors, of which device 700 provides but one example. The innovative methods, apparatus and systems are not necessarily limited to a particular form factor of immersive VR display, but may be used in a video output device that enables the user to control a position or point of view of video content playing on the device. Likewise, a VR or AR output device may manage an audio position or point of view of audio content playing on the device. The immersive VR stereoscopic display device 700 represents an example of a relatively low-cost device designed for consumer use.

The immersive VR stereoscopic display device 700 may include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD display. This modular design may avoid the need for dedicated electronic components for video output, greatly reducing the cost. The device 700 is designed to be worn close to the user's face, enabling a wide field of view using a small screen size such as typically found in present handheld tablet computing or smartphone devices. The support structure 726 may provide a fixed mounting for a pair of lenses 722 held in relation to the display screen 712. The lenses may be configured to enable the user to comfortably focus on the display screen 712 which may be held approximately one to three inches from the user's eyes.

The device 700 may further include a viewing shroud (not shown) coupled to the support structure 726 and configured of a soft, flexible or other suitable opaque material for form fitting to the user's face and blocking outside light. The shroud may be configured to ensure that the only visible light source to the user is the display screen 712, enhancing the immersive effect of using the device 700. A screen divider may be used to separate the screen 712 into independently driven stereoscopic regions, each of which is visible only through a corresponding one of the lenses 722. Hence, the immersive VR stereoscopic display device 700 may be used to provide stereoscopic display output, providing a more realistic perception of 3D space for the user. Two separate displays can also be used to provide independent images to the user's left and right eyes respectively. It should be appreciated that the present technology may be used for, but is not necessarily limited to, stereoscopic video output.

The immersive VR stereoscopic display device 700 may further comprise a bridge (not shown) for positioning over the user's nose, to facilitate accurate positioning of the lenses 722 with respect to the user's eyes. The device 700 may further comprise an elastic strap or band 724, or other headwear for fitting around the user's head and holding the device 700 to the user's head.

The immersive VR stereoscopic display device 700 may include additional electronic components of a display and communications unit 702 (e.g., a tablet computer or smartphone) in relation to a user's head 730. A support structure 726 holds the display and communications unit 702 using restraining device 724 that is elastic and/or adjustable to provide a comfortable and secure snug fit, for example, adjustable headgear. When wearing the support 726, the user views the display 712 though the pair of lenses 722. The display 712 may be driven by the Central Processing Unit (CPU) 703 and/or Graphics Processing Unit (GPU) 710 via an internal bus 717. Components of the display and communications unit 702 may further include, for example, a transmit/receive component or components 718, enabling wireless communication between the CPU and an external server via a wireless coupling. The transmit/receive component 718 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 718 may enable streaming of video data to the display and communications unit 702 from a local or remote video server, and uplink transmission of sensor and other data to the local or remote video server for control or audience response techniques as described herein.

Components of the display and communications unit 702 may further include, for example, one or more sensors 714 coupled to the CPU 703 via the communications bus 717. Such sensors may include, for example, an accelerometer/inclinometer array providing orientation data for indicating an orientation of the display and communications unit 702. As the display and communications unit 702 is fixed to the user's head 730, this data may also be calibrated to indicate an orientation of the head 730. The one or more sensors 714 may further include, for example, a Global Positioning System (GPS) sensor indicating a geographic position of the user. The one or more sensors 714 may further include, for example, a camera or image sensor positioned to detect an orientation of one or more of the user's eyes, or to capture video images of the user's physical environment (for VR mixed reality), or both. In some embodiments, a cameras, image sensor, or other sensor configured to detect a user's eyes or eye movements may be mounted in the support structure 726 and coupled to the CPU 703 via the bus 716 and a serial bus port (not shown), for example, a Universal Serial Bus (USB) or other suitable communications port. The one or more sensors 714 may further include, for example, an interferometer positioned in the support structure 704 and configured to indicate a surface contour to the user's eyes. The one or more sensors 714 may further include, for example, a microphone, array or microphones, or other audio input transducer for detecting spoken user commands or verbal and non-verbal audible reactions to display output. The one or more sensors may include, for example, electrodes or microphone to sense heart rate, a temperature sensor configured for sensing skin or body temperature of the user, an image sensor coupled to an analysis module to detect facial expression or pupil dilation, a microphone to detect verbal and nonverbal utterances, or other biometric sensors for collecting biofeedback data.

Sensor data from the one or more sensors may be processed locally by the CPU to control display output, and/or transmitted to a server for processing by the server in real time, or for non-real time processing. As used herein, "real time" refers to processing responsive to user input that controls display output without any arbitrary delay; that is, that reacts as soon as technically feasible. "Non-real time" refers to batch processing or other use of sensor data that is not used to provide immediate control input for controlling the display, but that may control the display after some arbitrary amount of delay.

Components of the display and communications unit 702 may further include, for example, an audio output transducer 720, for example a speaker or piezoelectric transducer in the display and communications unit 702 or audio output port for headphones or other audio output transducer mounted in headgear 724 or the like. The audio output device may provide surround sound, multichannel audio, so-called 'object oriented audio', or other audio track output accompanying a stereoscopic immersive VR video display content. Components of the display and communications unit 702 may further include, for example, a memory device 708 coupled to the CPU 703 via a memory bus. The memory 708 may store, for example, program instructions that when executed by the processor cause the apparatus 700 to perform operations as described herein. The memory 708 may also store data, for example, audio-video data in a library or buffered during streaming operations. The methods and systems described herein may be used with any suitable AR or VR equipment, including but not limited to the type of equipment described in connection with FIG. 7.

Further details regarding generation and use of VR environments may be as described in U.S. Provisional Patent Application Ser. Nos. 62/088,496, filed Dec. 5, 2014, and 62/330,708 filed May 2, 2016, which are incorporated herein in their entireties by reference. For example, Provisional Patent Application Ser. No. 62/330,708 filed May 2, 2016 (the "'708 application") describes adjusting an AR or VR object display based on geometrical relationship between the objective geometry for any given scene and a position/orientation of each viewer wearing AR or VR gear, relative to a display screen of known size. That application describes, among other things, adjustments that may be made to rendered object geometry to as to achieve a desired effect of an AR or VR object relative to a non-VR object or environment shown on a display screen, depending on the desired effect.

Mixed reality content can include content shown on a screen. A mixed reality screen is partly virtual, but is referenced to a real object in the environment. The reference object may be, for example, the side of a building, a wall of a room, a display surface of a television, tablet or mobile phone, or any other object having a screen-shaped surface. The mixed reality engine can cause 2D or stereoscopic 3D content to be "projected" on such a surface, such that a grammar is needed to handle how off-screen virtual objects relate to the onscreen objects.

To the extent that screens are used in a mixed reality session, the techniques and algorithms for real-time computational geometry matching for passing objects through a screen as taught by the '708 application can be directly applied to production of mixed reality content. These computations may be performed in real-time by the mixed reality output device. Once the position of the output device to the screen, and the screen size are defined, the geometric relationships, algorithms and methods described can be used to define transformations (e.g., matrices) for scaling, rotating, and translating off-screen objects to positions needed to implement an objective or subjective transition grammars as described in the '708 application.

Algorithms and methods described in the '708 application may be adapted to similarly control object geometry with respect to any selected non-screen reference object appearing in the user's physical environment. For example, the various different "grammars" described in the '708 application may be generalized from mixed-media content with display screens to mixed reality content, with or without incorporating any display screen.

In the context of mixed reality without onscreen content, "grammar" refers to a set of rules governing interaction between a viewer experiencing a POV into a mixed reality scene, and the physical scene that is being mixed. These rules might vary from scene to scene (or not), and such variation may itself be a dramatic element. Different grammars may be used for different entertainment objectives and mediums. For example, a fully interactive video-game like experience uses a different grammar than less interactive content aimed primarily at presenting a dramatic story. One aspect of grammar for mixed-media content concerns the relationship between the viewer and objects in the real scene. For example, miniaturized virtual objects may be desirable when the real scene is a miniaturized physical model, depending on the desired dramatic effect; life-sized virtual objects when the real scene is a natural environment, and so forth. These examples illustrate that one of the functions of mixed media grammar can be to maintain a defined geometric relationship between a reference object in the real scene and related objects experienced only in VR or AR.

Mixed reality applications that do not make use of a display screen are conceptually simpler than mixed media, because the real reference object in the scene is generally not used to convey images of scenes or objects projected onto it. Therefore, the relative size of the reference object does not change from cut to cut of the mixed reality session. In addition, transition grammar—meaning control of objects transitioning between a screen and an ARNR instantiation—is not generally a concern. Instead, in most mixed-reality content, grammar will entail maintaining a desired dramatic relationship between real reference objects and virtual objects, for example, life-sized, miniature, giant, growing, shrinking, and so forth. Therefore, the application process for mixed reality will often entail deriving an accurate model of the user's physical environment relative to the user, and then scaling, positioning and moving the virtual object relative to the model as needed to achieve the desired dramatic effect relative to the current physical environment, using systems and processes as described herein.

Figure 8:
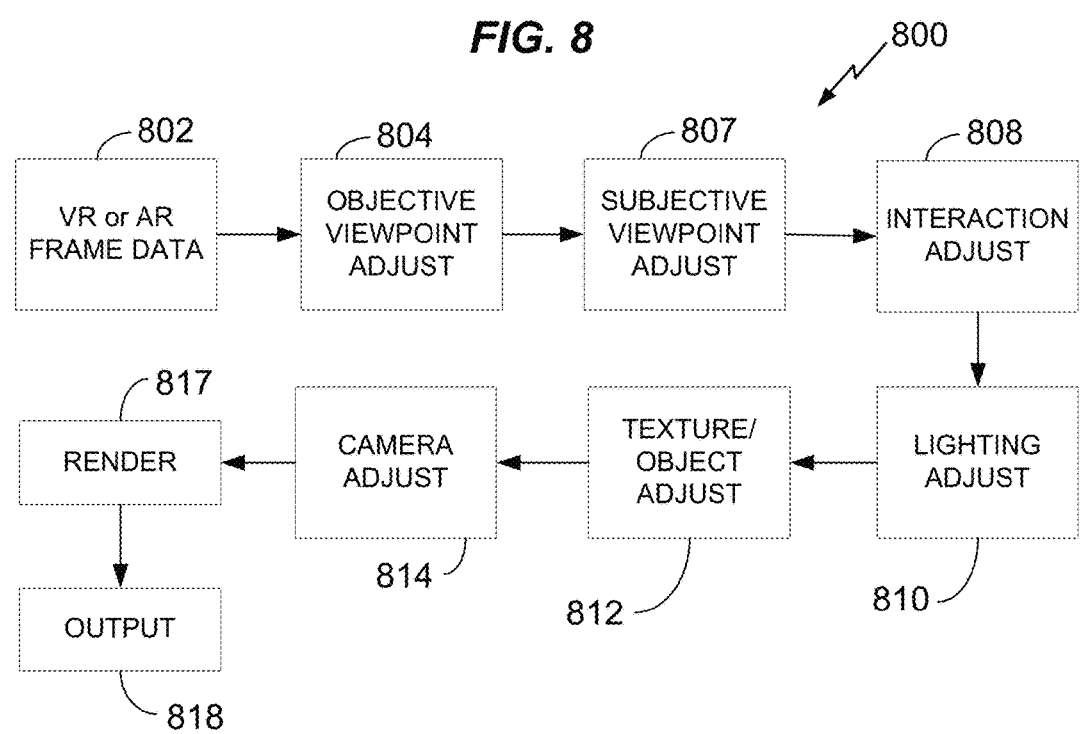
FIG. 8 is a concept diagram illustrating elements of a system integrating virtual content with real environment input to provide a mixed reality experience.

FIG. 8 shows a process or system 800 that integrates virtual content with real environment input to provide a mixed reality experience. Any one or all of the illustrated elements of the process 800 may be individually performed by each user's immersive output equipment or (except for output of rendered immersive content) by a cinema server or network. Initially, at 802, immersive digital mixed reality master data is obtained from a content selection engine as described herein above and decoded to obtain frame rendering parameters for each frame or set of frames. Such parameters may include, for example, selected library objects appearing in the scene, position and orientation of all objects to be rendered each associated with a set of position and orientation coordinates that are indicated as subjective or objective, associated object textures for rendered objects, lighting parameters, and camera parameters. Standard frame rendering parameters may then be adjusted for each frame or for sets of multiple contiguous frames, as necessary.

These adjustments may include a set of viewpoint adjustments 804, 806. Each of these viewpoint adjustments may include geometric adjustments as described in more detail herein below. For example, at 804, transforming objective coordinates for indicated objects to the coordinate system used by the applicable render engine for rendering a viewpoint. Generally, the transform 804 will transform an object's objective coordinates into the coordinates used by the applicable render engine for rendering immersive output for a particular immersive output device. The applicable render engine may be located variously, such as in a random access memory of an immersive device, in a local auxiliary device for the immersive output device, in a connected server or server farm, or in a cloud computing resource. In any case, the coordinate transform will be based on the coordinates used by the render engine and calibration data establishing the geometrical relationship between the user and the real scene's objective coordinates. Any suitable transform method as known in the art may be used for the coordinate transform.

The adjustments may further include, at 806, transforming subjective coordinates for indicated objects to the coordinate system used by the applicable render engine for rendering a viewpoint. In the trivial case, no transformation is needed because the common subjective values will work for every render engine, and are the same for every user. However, in some cases certain transformation may be needed to put subjective coordinates in proper condition for rendering, for example converting to a different type of coordinate system to facilitate a particular render engine or adding a fixed offset value to account for physical differences between users participating in a multi-player session.

The adjustments may further include, at 808, adjusting a position or orientation of rendered objects based on user input, in the case of interactive objects. The appearance, position, or orientation of selected objects may depend on user input. The influence of user input may be limited to specified objects and ranges of change, to prevent disrupting the flow of a narrative performance and maintain contemporaneous audience members in sync.

The adjustments may further include, at 810, adjusting scene lighting parameters. In an aspect, position and orientation of scene lights may be designated objective or subjective, and transformed as needed like any other off screen object with respect to position and orientation coordinated. In addition, other lighting parameters, such as intensity or color, may also be adjusted so that the brightness and color of rendered scene elements matches the brightness and color of output on the theater's display screen.

The adjustments may further include, at 812, adjusting object texture, for example, applying an automatic level of detail based on a distance between the rendered viewpoint and each rendered object, or equivalent measure. Automatic level of detail provides less detailed texture maps for more distant objects, to improve rendering performance. Similarly, automatic level of detail adjustments may be used to select a mesh density for off screen objects based on distance from the viewpoint, again for rendering efficiency.

The adjustments may further include, at 814, adjusting camera parameters other than position and orientation, such as focal point, field of field, and aperture, based on immersive input. Hence, an immersive render engine may allow a user to "zoom in" or "zoom out" on the scene, with appropriate camera adjustments. Once adjustments are made the render engine may render the scene at 816 and the rendered data may be displayed using an immersive output device at block 818.

In view the foregoing, and by way of additional example, FIGS. 9-12 show aspects of a method 900 or methods for virtual content selection in a mixed reality output process. The method 900 may be performed by an AR output device including a programmable computer, by a VR output device including a programmable computer, by one or more computers in communication with the AR output device or VR output device, or by a combination of an AR or VR output device and one or more computers in communication with the output device.

Referring to FIG. 9, a computer-implemented method for virtual content selection in a mixed reality output process may include, at 910, imaging a real scene encompassing a user wearing a mixed reality output apparatus (e.g., an AR or VR headset). Further aspects of the imaging are described below in connection with FIG. 10, and some examples are provided above in connection with FIG. 5. The imaging is performed in real time, contemporaneously or immediately before a mixed reality session executing in the mixed reality apparatus.

The method 900 may include, at 920, determining context parameter data describing a real context of the real scene, based on the imaging. Further examples of context determination are described in connection with FIG. 11, and examples are provided in the discussion above, for example, in connection with FIG. 5.

The method 900 may include, at 930, selecting a set of content from a content library, based on the data (context parameters) describing a real context, wherein the context parameters enable rendering of a virtual object in a mixed reality session by the mixed reality output apparatus. The context parameters are provided to the mixed reality session, which renders the virtual object based on the selected parameters, and outputs a rendering of the virtual object in a display of the mixed reality output apparatus. Thus, the method 900 may include, at 940, rendering the virtual object in the mixed reality session by the mixed reality output apparatus, optionally based on the context parameters.

The method 900 may include any one or more of additional operations 1000, 1100, or 1200, shown in FIGS. 10-12, in any operable order. Each of these additional operations is not necessarily performed in every embodiment of the method, and the presence of any one of the operations 1000, 1100, or 1200 does not necessarily require that any other of these additional operations also be performed.

Referring to FIG. 10 showing certain additional operations 1000 for imaging a scene, the method 900 may further include, at 1010, imaging the real scene at least in part by activating a camera coupled to the mixed reality output apparatus, and receiving images of the real scene from the camera. The camera may be one of a pair, or one of several, in an array. The mixed reality apparatus may analyze the images from an array based on photogrammetry, and construct a 3D model of the imaged scene based on the photogrammetric analysis of the image data from the array. Images may be collected and analyzed periodically, for example, once per second.

In addition, the method 900 may include, at 1020, imaging the real scene at least in part by activating a depth sensor coupled to the mixed reality output apparatus. A depth sensor may include, for example, a sonar device with an emitter and receiver. Reflection of a known pulse can be analyzed by the mixed reality apparatus, obtaining an estimated distance to an object surface and estimated solidity of the object.

In addition, the method 900 may include, at 1030, imaging the real scene at least in part by activating a microphone coupled to the mixed reality output apparatus. An encoded acoustic signal from the microphone may be analyzed to determine acoustic conditions of the environment. For example, traffic noise can be used as an indicator that the user is near a busy street, and so forth.

In addition, the method 900 may include, at 1040, imaging the real scene at least in part by activating a radio receiver coupled to the mixed reality output apparatus. The radio receiver may be tuned to receive object identifiers from RFID tags placed in scene objects, or to receive a broadcast from a location transmitter conveying encoded data describing elements of a local scene.

In addition, the method 900 may include, at 1050, imaging the real scene at least in part by activating a triangulating locating device coupled to the mixed reality output apparatus. For example, the mixed reality apparatus may include a GPS receiver, which determines location coordinates of the apparatus.

Referring to FIG. 11 showing certain additional operations 1100, the method 900 may further include, at 1110, determining the data describing a real context at least in part by characterizing a volumetric geometry of the real scene, based on the imaging. Aspects of the characterizing volumetric geometry may be as described above in connection with FIG. 5. The volumetric geometry identifies volumes in the real environment with basic characteristics such as solid, liquid, air, or mixed.

In addition, the method 900 may further include, at 1120, determining the data describing a real context at least in part by characterizing a condition of the real scene, based on the imaging. For example, based on image information the mixed reality apparatus may determine types, intensities and colors of virtual light used to render a virtual object to be inserted into the scene. In addition, the apparatus may determine current weather conditions, or other conditions of the real environment that are pertinent to characteristics of the virtual object. For example, if a strong wind is sensed in the real environment, the mixed reality apparatus may render the effects of the wind using a wind-simulating animation loop.

In addition, the method 900 may further include, at 1130, determining the data describing a real context at least in part by determining an object type, based on a characteristic volumetric geometry determined based on the imaging. Examples were provided in connection with FIG. 5. A set of geometric objects may be bounded by ranges of object parameters defining a type. The mixed reality apparatus may select the object type that most closely matched the sensed parameter set for an object. Any other suitable object recognition algorithm may be used.

In addition, the method 900 may further include, at 1140, determining the data describing a real context at least in part by determining an identity of a scene or of an object in the scene, based on the imaging. Identity may be determined, for example, by reading identify tags associated with sensed objects, or by comparing location coordinates to a database of located objects (e.g., a map).

The method 900 may further include other techniques for determining the data describing the real context. For example, the data describing the real context may be determined at least in part by analyzing images of the real scene using automatic object or scene recognition algorithms based on 2D image input. In an alternative, or in addition, the data describing the real context may be determined at least in part by analyzing images of the real scene using stereogrammetry to determine 3D geometry of the user's real environment or of objects in the environment, and using the 3D geometry to identify the objects, type of environment, or location.

Referring to FIG. 12 showing certain additional operations 1200 for selecting content to be inserted into a mixed reality session, the method 900 may further include, at 1210, selecting the set of content (parameter set) characterizing a virtual object to be inserted into the mixed reality process further based on heuristic feedback. Some examples are provided in connection with FIG. 6 above. The heuristic feedback may include, for example, implied or expressed user preference information concerning past objects rendered in the mixed reality session or in related sessions. Data recording any past mixed reality session events that may be used to inform a future content choice may be collected and applied as heuristic feedback.

In addition, the method 900 may further include, at 1220, selecting the set of content characterizing a virtual object to be inserted into the mixed reality process further based on a session context of the mixed reality session. Session context means the current narrative or game state of the mixed reality session. Characteristics of the virtual object may likewise be selected based on an intended effect or narrative purpose for the game or narrative mixed reality session.

In addition, the method 900 may further include, at 1230, updating the set of content characterizing the virtual object already inserted into the mixed reality process based on the data describing the real context and the session context. As the real environment and session context evolve, the virtual object's parameters may evolve accordingly until a behavior parameter removes the virtual object from the session entirely. Until then, the virtual object may move about and react to environmental factors and user input in various ways.

Figure 13:
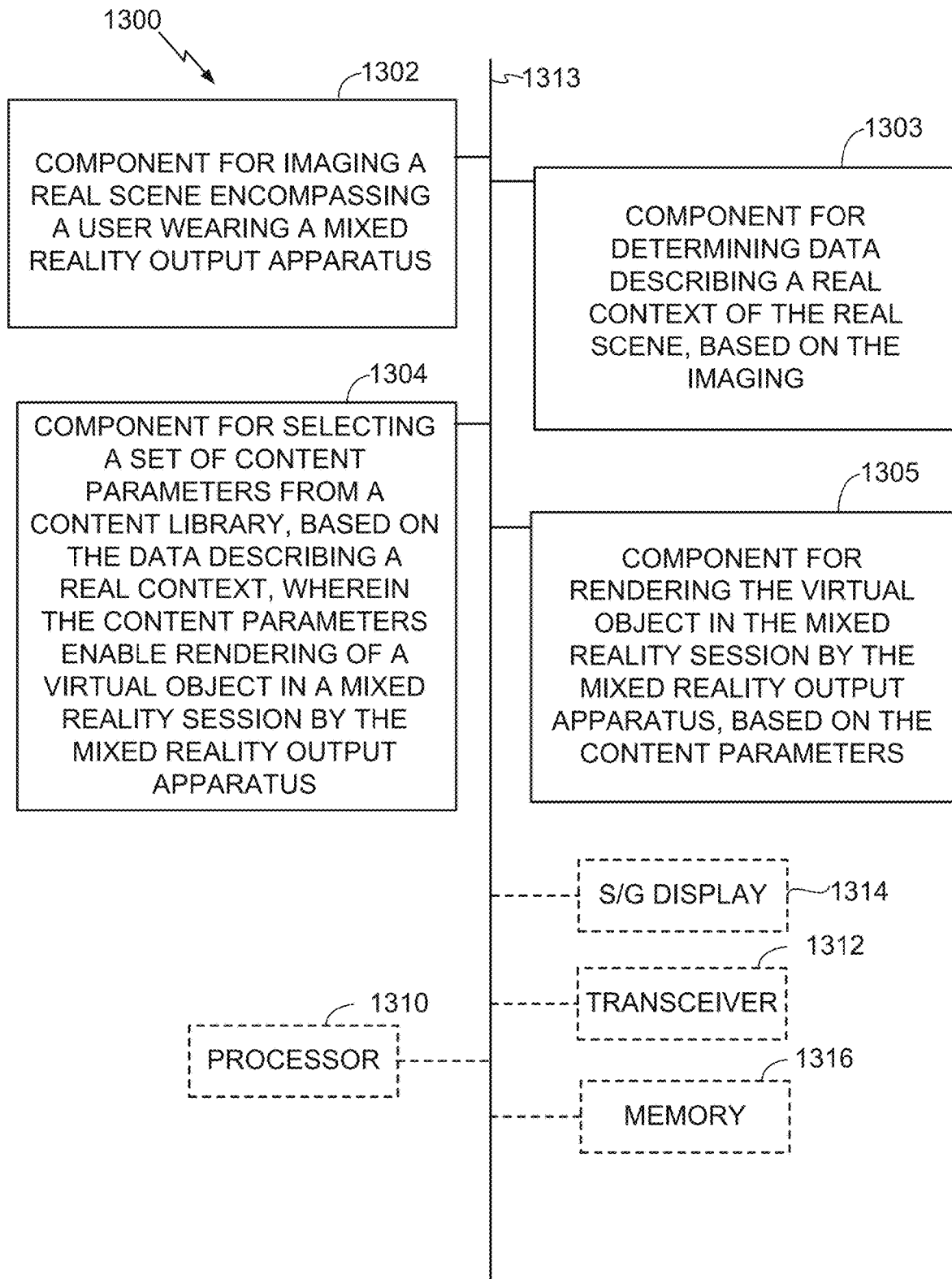
FIG. 13 is a conceptual block diagram illustrating components of an apparatus or system for mixed reality content selection.

FIG. 13 is a conceptual block diagram illustrating components of an apparatus or system 1300 for virtual content selection in a mixed reality output process, as described herein. The apparatus or system 1300 may include additional or more detailed components for performing functions or process operations as described herein. For example, the processor 1310 and memory 1316 may contain an instantiation of a process for scene and object characterization (real context determination) as described herein above. As depicted, the apparatus or system 1300 may include functional blocks that can represent functions implemented by a processor, software, or combination thereof (e.g., firmware).

As illustrated in FIG. 13, the apparatus or system 1300 may comprise an electrical component 1302 for imaging a real scene encompassing a user wearing a mixed reality output apparatus. The component 1302 may be, or may include, a means for said imaging. Said means may include the processor 1310 coupled to the memory 1316, and to an output of a sensor array (not shown), the processor executing an algorithm based on program instructions stored in the memory. Such algorithm may include a sequence of more detailed operations, for example, as described in connection with FIG. 10.

The apparatus 1300 may further include an electrical component 1303 for determining data describing a real context of the real scene, based on the imaging. The component 1303 may be, or may include, a means for said determining. Said means may include the processor 1310 coupled to the memory 1316, the processor executing an algorithm based on program instructions stored in the memory. Such algorithm may include a sequence of more detailed operations, for example, as described in connection with FIG. 5 or 11.

The apparatus 1300 may further include an electrical component 1304 for selecting a set of content from a content library, based on the data describing a real context. The component 1304 may be, or may include, a means for said selecting. Said means may include the processor 1310 coupled to the memory 1316 and to a sensor (not shown), the processor executing an algorithm based on program instructions stored in the memory. Such algorithm may include a sequence of more detailed operations, for example, as described in connection with FIG. 6 or 12.

The apparatus 1300 may further include an electrical component 1305 for rendering the virtual object in the mixed reality session by the mixed reality output apparatus, optionally based on the context parameters. The component 1305 may be, or may include, a means for said rendering. Said means may include the processor 1310 coupled to the memory 1316, the processor executing an algorithm based on program instructions stored in the memory. Such algorithm may include a sequence of more detailed operations, for example, selecting a rendering engine, providing object parameters to the rendering engine, executing the rendering engine to produce an image, and sending the image for display on an output component of the mixed reality apparatus.

The apparatus 1300 may optionally include a processor module 1310 having at least one processor. The processor 1310 may be in operative communication with the modules 1302-1305 via a bus 1313 or similar communication coupling. In the alternative, one or more of the modules may be instantiated as functional modules in a memory of the processor. The processor 1310 may effect initiation and scheduling of the processes or functions performed by electrical components 1302-1305.

In related aspects, the apparatus 1300 may include a network interface module (not shown) operable for communicating with system components over a computer network, instead of or in addition to the transceiver 1312. A network interface module may be, or may include, for example, an Ethernet port or serial port (e.g., a Universal Serial Bus (USB) port). In further related aspects, the apparatus 1300 may optionally include a module for storing information, such as, for example, a memory device 1316. The computer readable medium or the memory module 1316 may be operatively coupled to the other components of the apparatus 1300 via the bus 1313 or the like. The memory module 1316 may be adapted to store computer readable instructions and data for effecting the processes and behavior of the modules 1302-1305, and subcomponents thereof, or the processor 1310, or the method 1200 and one or more of the additional operations 1000-1200 disclosed herein. The memory module 1316 may retain instructions for executing functions associated with the modules 1302-1305. While shown as being external to the memory 1316, it is to be understood that the modules 1302-1305 can exist within the memory 1316 or an on-chip memory of the processor 1310.

The apparatus 1300 may include a transceiver 1312 configured as a wireless transmitter/receiver, or a wired transmitter/receiver, for transmitting and receiving a communication signal to/from another system component such as, for example, an RFID tag or location information transmitter. In alternative embodiments, the processor 1310 may include networked microprocessors from devices operating over a computer network. In addition, the apparatus 1300 may include a stereoscopic display or other immersive display device 1314 for displaying immersive content. The stereoscopic display device 1314 may be, or may include, any suitable stereoscopic AR or VR output device as described herein above, or as otherwise known in the art.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method by a mixed reality apparatus for operating a mixed reality session playing immersive interactive game content, the method comprising:
   imaging a real scene encompassing a user wearing a mixed reality output apparatus during the mixed reality session;
   determining context parameter data indicating a real context of the real scene, based on the imaging;
   determining a session context indicating a current game state of an interactive game playing in the mixed reality session, wherein the current game state comprises an indication of user progress through the immersive interactive game content;
   selecting a set of content from multiple sets of content in a content library, by a selection algorithm that eliminates library content from selection based on the context parameter data and further based on the session context, wherein the selecting comprises selecting a class of content based on the context parameter data and the session context and randomly selecting a particular instance from the class of content; and
   rendering a virtual object in the mixed reality session by the mixed reality output apparatus, based on the set of content and on the data describing a real context.

2. The method of claim 1, further comprising activating a device coupled to the mixed reality output apparatus, wherein the device is selected from a group consisting of a camera, a depth sensor, a microphone, a radio receiver, or a triangulating locating device.

3. The method of claim 1, further comprising characterizing a volumetric geometry of the real scene, based on the imaging.

4. The method of claim 1, further comprising characterizing a condition of the real scene, based on the imaging.

5. The method of claim 1, further comprising determining an object type, based on a characteristic volumetric geometry determined based on the imaging.

6. The method of claim 1, further comprising determining an identity of a scene or of an object in the scene, based on the imaging.

7. The method of claim 1, wherein selecting the set of content characterizing a virtual object to be inserted into the mixed reality session is further based on heuristic feedback.

8. The method of claim 1, wherein selecting the set of content characterizing a virtual object to be inserted into the mixed reality session is based on a session context of the mixed reality session further comprising managing exit of the virtual object from the virtual reality session based on the session context and real context.

9. The method of claim 1, wherein further comprising updating the set of content characterizing the virtual object already inserted into the mixed reality session based on the data describing the real context and the session context.

10. An apparatus for selecting content for a mixed reality session playing immersive interactive game content, comprising:
   a processor, a memory coupled to the processor, and a stereoscopic display device coupled to the processor, wherein the memory holds instructions that when executed by the processor, cause the apparatus to perform:
   imaging a real scene encompassing a user wearing a mixed reality output apparatus during the mixed reality session;
   determining context parameter data indicating a real context of the real scene, based on the imaging;
   determining a session context indicating a current game state of an interactive game playing in the mixed reality session, wherein the current game state comprises an indication of user progress through the immersive interactive game content;
   selecting a set of content from multiple sets of content in a content library, by a selection algorithm that eliminates library content from selection based on the context parameter data and further based on the session context and on an intended effect of the interactive game, wherein the selecting comprises selecting a class of content based on the context parameter data and the session context and randomly selecting a particular instance from the class of content; and
   rendering a virtual object in the mixed reality session by the mixed reality output apparatus, based on the set of content and on the data describing a real context.

11. The apparatus of claim 10, wherein the memory holds further instructions for activating a device coupled to the mixed reality output apparatus, wherein the device is selected from a group consisting of a camera, a depth sensor, a microphone, a radio receiver, or a triangulating locating device.

12. The apparatus of claim 10, wherein the memory holds further instructions for characterizing a volumetric geometry of the real scene, based on the imaging.

13. The apparatus of claim 10, wherein the memory holds further instructions for characterizing a condition of the real scene, based on the imaging.

14. The apparatus of claim 10, wherein the memory holds further instructions for determining an object type, based on a characteristic volumetric geometry determined based on the imaging.

15. The apparatus of claim 10, wherein the memory holds further instructions for determining an identity of a scene or of an object in the scene, based on the imaging.

16. The apparatus of claim 10, wherein the memory holds further instructions for selecting the set of content characterizing a virtual object to be inserted into the mixed reality session further based on heuristic feedback.

17. The apparatus of claim 10, wherein the memory holds further instructions for selecting the set of content characterizing a virtual object to be inserted into the mixed reality session is based on a session context of the mixed reality session managing exit of the virtual object from the virtual reality session based on the session context and real context.

18. The apparatus of claim 10, wherein the memory holds further instructions for updating the set of content characterizing the virtual object already inserted into the mixed reality session based on the data describing the real context and the session context.

19. A non-transitory computer-readable medium, encoded with instructions that, when executed by a processor, cause an apparatus for selecting content for a mixed reality session playing immersive interactive game content to perform:

imaging a real scene encompassing a user wearing a mixed reality output apparatus during the mixed reality session;

determining context parameter data indicating a real context of the real scene, based on the imaging;

determining a session context indicating a current game state of an interactive game playing in the mixed reality session, wherein the current game state comprises an indication of user progress through the immersive interactive game content;

selecting a set of content from multiple sets of content in a content library, by a selection algorithm that eliminates library content from selection based on the context parameter data and further based on the session context and on an intended effect of the interactive game, wherein the selecting comprises selecting a class of content based on the context parameter data and the session context and randomly selecting a particular instance from the class of content; and rendering a virtual object in the mixed reality session by the mixed reality output apparatus, based on the set of content and on the data describing a real context.

\* \* \* \* \*